Dec. 20, 1932.  R. L. SWARTZ  1,891,787

DISPENSER

Filed Dec. 4, 1931

R.L. Swartz
INVENTOR

BY Frease and Bishop
ATTORNEYS

Patented Dec. 20, 1932

1,891,787

UNITED STATES PATENT OFFICE

RICHEY L. SWARTZ, OF CANTON, OHIO

DISPENSER

Application filed December 4, 1931. Serial No. 578,903.

The invention relates to a device for dispensing granular or powdered material such as coffee, malted milk and the like and more particularly to a device for measuring the quantity of material dispensed.

The object of the improvement is to provide a dispensing apparatus adapted to contain a quantity of granular or powdered material such as ground coffee or the like in substantially air-tight condition and to dispense measured quantities thereof as desired.

Another object is to provide means for agitating the material with each operation of the device in order to prevent the material from packing or becoming arched over the discharging end of the device.

Figure 1:
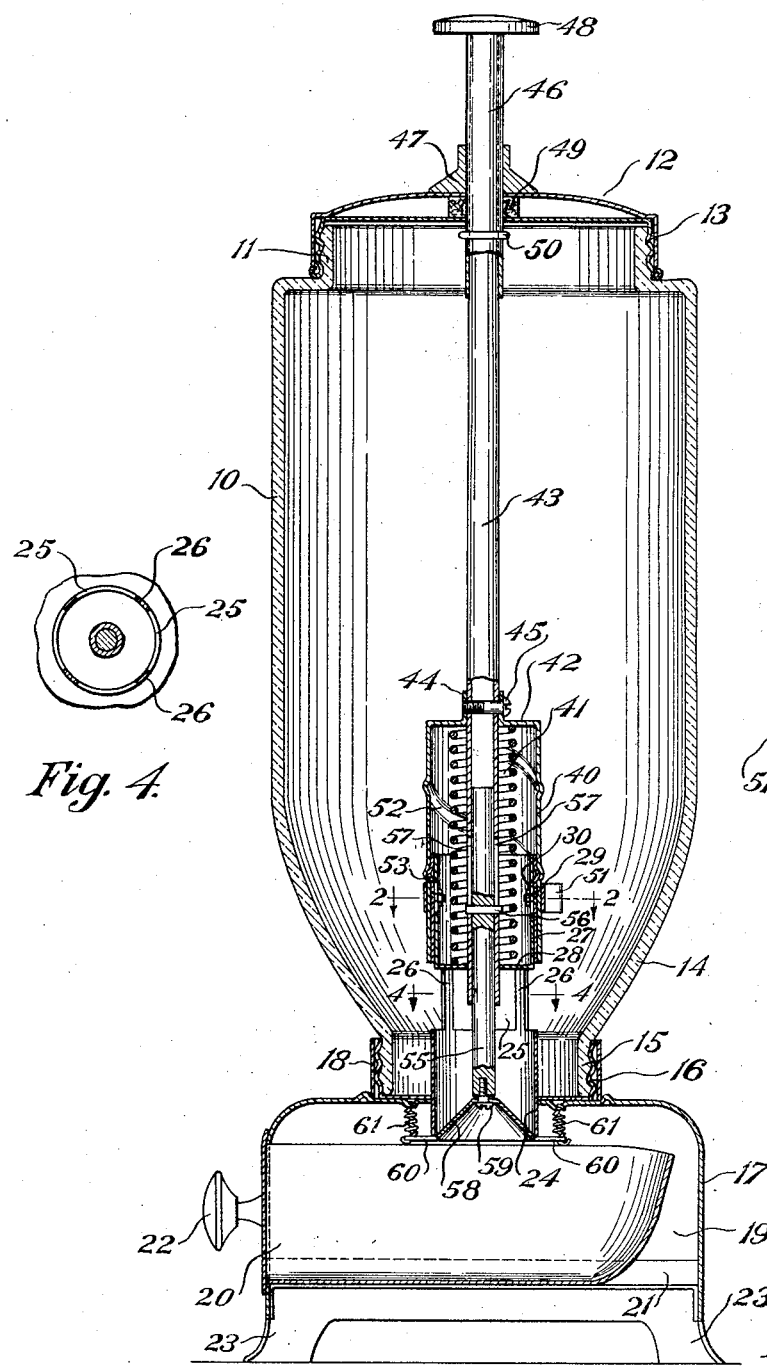
Figure 1:
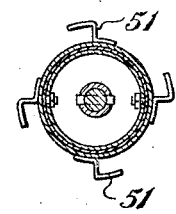

The above and other objects may be attained by constructing the invention in the manner illustrated in the accompanying drawing, in which Figure 1 is a vertical sectional view of the improved dispenser;

Fig. 2, a section on the line 2—2, Fig. 1 showing the agitating means;

Fig. 3, a fragmentary elevation of the agitating means; and

Fig. 4, a section on the line 4—4, Fig. 1.

Similar numerals refer to similar parts throughout the drawing.

The device includes a reservoir or receptacle 10 preferably formed of glass so that the contents thereof are always visible. If desired, the upper end of the container may be provided with a reduced neck 11 through which the receptacle may be filled. This filling opening is arranged to be normally closed by a cover or lid shown generally at 12 which may be detachably connected to the neck 11 as by the screw threads 13.

The screw cover 12 may be formed of a double thickness of sheet metal or the like as illustrated in Fig. 1 for the purpose of improving the exterior appearance thereof.

The lower portion of the container 10 is preferably tapered as at 14 and terminates in the reduced threaded neck 15 for connection to the threaded collar 16 of the base 17. The threaded collar 16 may, for the sake of appearance, be surrounded by a cylindric collar 18 attached to the base 17. This base may be of sheet metal or the like and has a chamber 19 formed therein to receive the scoop or drawer 20 which is slidably mounted upon the guides 21 and provided with a handle knob 22 for withdrawing the same from the base or replacing it therein. Feet 23 may be provided upon the lower portion of the base for supporting the device upon a table or the like.

A tubular discharge spout 24 is located in the lower portion of the container 10, preferably extending downward for a short distance below the top wall of the base 17. This tubular discharge spout extends for a considerable distance upward into the container 10 and the intermediate portion thereof is provided with substantially large openings 25 separated by the relatively narrow ribs 26.

For the purpose of regulating the quantity of material to be discharged with each operation of the device, a sleeve 27, having a closed bottom 28, is adjustably mounted within the upper portion of the discharge spout 24 as by means of the bolts 29 located through the slots 30 in said sleeve. The lower closed end of this sleeve is adapted to cover the upper portions of the openings 25 if it is desired to cut down the amount of material to be discharged with each operation.

A sleeve 40 is slidably mounted over the discharge spout, being normally held in raised position, above the openings 25 therein, as by the coil spring 41 located between the bottom wall 28 of the adjustable regulating sleeve 27, and the top wall 42 of the sleeve 40.

The sleeve 40 may be reciprocated upon the discharge spout as by the rod or tube 43 which may extend downward through the sleeve 40, being connected to the reduced neck 44, at the upper end of said sleeve, as by the screw 45.

The upper end of the tube 43 may be connected to or extended into the plunger 46 which is slidably located through the removable cover 12 and through the bearing 47 formed thereon, a button or knob 48 being preferably provided at the upper end of said plunger so that the same may be easily depressed by hand.

A felt washer 49 may be located around the plunger 46 between the spaced walls of the removable cover 12, and a collar 50 may be formed upon the lower portion of the plunger to prevent accidental withdrawal of the plunger. The cut-off sleeve 40 may be provided with a plurality of angular wings 51 for agitating the material in the lower portion of the container so as to prevent the same from packing or arching over the discharge outlet.

For the purpose of increasing the agitation of the material, the sleeve 40 may be arranged to rotate as it reciprocates over the discharge spout. This may be accomplished by providing a spiral groove 52 in the interior of the sleeve 40 to receive a similar rib 53 upon the upper portion of the discharge spout 24. Thus as the sleeve 41 is moved downward over the discharge spout, it will be slightly rotated around the same, the angular wings 51 being rotated through the material as they pass downward and again upward with the sleeve 40, causing sufficient agitation of the material in the lower portion of the container 10 to prevent packing or arching of the same at this point and assuring proper feeding of the material.

A rod 55 is mounted within the lower end of the tube 43 and has a pin 56 located transversely therethrough and extending into the elongated slots 57 in the tube 43. These slots are of a length equal to the height of the openings 25 in the discharge spout.

A conical valve 58 is swivelled upon the lower end of the rod 55 as by the shouldered screw 59 and provided with radially disposed ears 60 to which are connected pull springs 61, the upper ends of which are connected to the top wall of the base 17 whereby the valve is normally held in closed position as shown in Fig. 1.

As the plunger 46 is depressed, the sleeve 40 will be slowly rotated and moved downward, the lower end thereof having just registered with the lower edges of the openings 25 in the discharge spout at the time the upper ends of the slots 57 in the tube 43 contact with the ends of the pin 56 in the rod 55.

Further downward movement of the tube 43 will cause the valve to open after the openings 25 of the discharge spout have been covered by the sleeve 40. Thus the quantity of coffee or other material contained within the lower end of the discharge spout will be discharged into the scoop or drawer 20.

Upon release of the plunger the spring 41 will raise the parts to the normal position shown in the drawing and the discharge spout will again be filled with material passing from the lower portion of the container through the openings 25 so that the next depression of the plunger will again deliver the same amount of material to the drawer 20. Thus a measured quantity of material is delivered with each operation of the plunger.

I claim:

1. A dispenser including a container, a discharge tube in the lower portion of the container and provided with openings in its sides, a sleeve slidable over the discharge tube, a valve normally closing the lower end of the discharge tube, and means for sliding the sleeve over the openings in the discharge tube and for opening said valve.

2. A dispenser including a container, a discharge tube in the lower portion of the container and provided with openings in its sides, a sleeve slidable over the discharge tube, a valve normally closing the lower end of the discharge tube, and means for sliding the sleeve over the openings in the discharge tube and for opening said valve after the sleeve is entirely over the openings.

3. A dispenser including a container, a discharge tube in the lower portion of the container and provided with openings in its sides, a sleeve slidable over the discharge tube, agitating wings upon said sleeve, a valve normally closing the lower end of the discharge tube, and means for sliding the sleeve over the openings in the discharge tube and for opening said valve.

4. A dispenser including a container, a discharge tube in the lower portion of the container and provided with openings in its sides, a sleeve slidable over the discharge tube, agitating wings upon said sleeve, a valve normally closing the lower end of the discharge tube, and means for rotating and sliding the sleeve over the openings in the discharge tube and for opening said valve.

5. A dispenser including a container, a discharge tube in the lower portion of the container and provided with openings in its sides, means for adjusting the size of said openings, a sleeve slidable over the discharge tube, a valve normally closing the lower end of the discharge tube, and means for sliding the sleeve over the openings in the discharge tube and for opening said valve.

6. A dispenser including a container, a discharge tube in the lower portion of the container and provided with openings in its sides, a cut-off sleeve slidable over the discharge tube, a valve normally closing the lower end of the discharge tube, and a rod operatively associated with the sleeve and valve for sliding the cut-off sleeve over the openings in the discharge tube and for opening the valve.

7. A dispenser including a container, a discharge tube in the lower portion of the container and provided with openings in its sides, a cut-off sleeve slidable over the discharge tube, a valve normally closing the lower end of the discharge tube, and a rod operatively associated with the sleeve and valve for sliding the cut-off sleeve over the openings in the discharge tube and for opening the valve after the sleeve is entirely over said openings.

8. A dispenser including a container, a discharge tube in the lower portion of the container and provided with openings in its sides, an adjustable sleeve within said discharge tube for adjusting the size of said openings, a cut-off sleeve slidable over the discharge tube, a valve normally closing the lower end of the discharge tube, and a rod operatively associated with the sleeve and valve for sliding the cut-off sleeve over the openings in the discharge tube and for opening the valve.

9. A dispenser including a container, a discharge tube in the lower portion of the container and provided with openings in its sides, a sleeve slidable over the discharge tube, a conical valve at the lower end of the discharge tube, spring means for normally holding said valve in closed position, and a rod operatively associated with the sleeve and valve for sliding the sleeve over the openings in the discharge tube and for opening the valve.

10. A dispenser including a container, a discharge tube in the lower portion of the container and provided with openings in its sides, a sleeve slidable over the discharge tube, a conical valve at the lower end of the discharge tube, spring means for normally holding said valve in closed position, and a rod operatively associated with the sleeve and valve for sliding the sleeve over the openings in the discharge tube and for opening the valve after the sleeve is entirely over said openings.

11. A dispenser including a container, a discharge tube in the lower portion of the container and provided with openings in its sides, a sleeve slidable over the discharge tube, a valve normally closing the lower end of the discharge tube, a rod connected to the sleeve for sliding the sleeve over the openings in the discharge tube, and a second rod operatively associated with the valve and telescopically connected to the first named rod for opening the valve after the sleeve has entirely covered said openings.

In testimony that I claim the above, I have hereunto subscribed my name.

RICHEY L. SWARTZ.